(12) United States Patent
Lin

(10) Patent No.: US 6,182,916 B1
(45) Date of Patent: Feb. 6, 2001

(54) MEASURING TAPE DISPENSER WITH AN IMPACT BUFFER HOUSING AND TENTATIVE TAPE HALTING MEANS

(75) Inventor: Henry Lin, Taipei (TW)

(73) Assignee: Index Measuring Tape Co., Ltd., Taipei (TW)

(*) Notice: Under 35 U.S.C. 154(b), the term of this patent shall be extended for 0 days.

(21) Appl. No.: 09/438,414

(22) Filed: Nov. 12, 1999

(51) Int. Cl.[7] .............................. B65H 75/48; G01B 3/10
(52) U.S. Cl. .................. 242/379; 242/376; 242/379.1; 242/381.2; 242/381.6; 242/396.7; 242/396.9; 242/398; 242/405.3; 33/761; 33/767; 33/769
(58) Field of Search .................. 242/379, 379.1, 242/379.2, 381, 381.1, 381.2, 381.3, 382, 381.6, 396.7, 396.9, 405, 405.3, 376, 398; 33/754, 755, 758, 761, 767, 769, 740

(56) References Cited

U.S. PATENT DOCUMENTS

| | | | |
|---|---|---|---|
| 1,564,456 | * 12/1925 | Taylor | 242/398 X |
| 1,609,852 | * 12/1926 | Witchger | 242/398 X |
| 1,715,156 | * 5/1929 | Witchger | 242/398 X |
| 1,812,965 | * 7/1931 | Langsner | 242/398 X |
| 1,832,674 | * 11/1931 | Weibrecht | 242/398 X |
| 2,914,269 | * 11/1959 | Freeman | 242/405 |
| 3,450,367 | * 6/1969 | Edgell | 242/381.3 X |
| 4,068,383 | * 1/1978 | Krebs | 33/769 X |
| 4,121,785 | * 10/1978 | Quenot | 242/405 X |
| 4,142,693 | * 3/1979 | Czerwinski | 33/769 X |
| 4,215,828 | * 8/1980 | Rathbun et al. | 242/398 X |
| 4,286,387 | * 9/1981 | Di Diego | 242/405 X |
| 5,746,004 | * 5/1998 | Wertheim | 33/769 X |
| 6,032,896 | * 3/2000 | Liu | 242/379 X |

\* cited by examiner

*Primary Examiner*—Donald P. Walsh
*Assistant Examiner*—William A. Rivera
(74) *Attorney, Agent, or Firm*—Dougherty & Troxell

(57) ABSTRACT

A measuring tape dispenser with an impact buffer housing and tentative tape halting device, in which the housing is at least or partially covered with an impact buffer layer formed of an elastic material so as to protect the housing from being deformed or even destroyed. Furthermore, a slip resistant effect and tentative tape halting device is also provided.

1 Claim, 5 Drawing Sheets

MEASURING TAPE DISPENSER WITH AN IMPACT BUFFER HOUSING AND TENTATIVE TAPE HALTING MEANS

BACKGROUND OF THE INVENTION

1. Field of the Invention

The present invention relates to a measuring tape dispenser with an impact buffer housing and tentative tape halting means, wherein the housing is entirely or partially covered with an impact buffer layer formed of an elastic material so as to protect the housing from being deformed or even destroyed by impact, furthermore a slip resistant effect and tentative tape halting means are also provided for the measuring tape dispenser.

2. Description of the Prior Art

FIGS. 1A and 1B show schematic drawings of the structure for a conventional measuring tape dispenser. As shown in the drawings, a conventional measuring tape dispenser is constituted of a housing 11, a brake button 12, a tape 13, a coiled spring 14, and a reel. The housing 11 is made of a single brittle material, for example, acrylonitrile-butadiene-styrene (ABS) which is vulnerable to impact resulting in deformation or destruction. Besides, the slippery surface of the housing formed of the above mentioned material is apt to cause a measuring tape dispenser to skip out of the grasp of the sweating palm of an user and fall down on the ground.

As for the tape halting means for a conventional measuring tape dispenser, when it is intended to halt the moving tape 13 at a desired position, the brake button 12 is pushed downward to the lower position of a slide slot formed on the housing 11 so that the lower terminal 121 of the brake button 12 forcibly presses the tape 13 against the housing 11 and tightly sandwiches and detains the tape 13 therebetween. However, there is no means for tentatively halting the tape 13 at a transient position desirable during measuring work.

Coming to the realization of such shortcoming as described above, the present inventor carried out studies and experiments for a long time. Based on these studies and researches, the present inventor came to propose the present invention.

SUMMARY OF THE INVENTION

Therefore, it is an object of the present invention to provide a measuring tape dispenser with an impact buffer and slip resistant housing.

It is another object of the present invention to provide a measuring tape dispenser with tentative tape halting means.

To achieve the above mentioned objects, the tape housing of the present invention, as a conventional product, made of a single material for example, ABS which is vulnerable to impact, is entirely or partially, for example, only at the turning corners, covered with an impact buffer and slip resistant layer formed of an elastic material so as to protect the housing from being deformed or even destroyed by impact.

Besides, on the tape housing of the present invention, there is provided tentative tape halting means with an integrally formed push button, by lightly pressing the push button with a thumb against the side wall of a reel installed inside the tape housing to tentatively stop rotation of the reel thereby detaining the tape at a transient position desired by the operator during reeling in or reeling out the tape.

A more complete understanding of these and other features and advantages of the present invention will become apparent from a careful consideration of the following detailed description of certain embodiments illustrated in the accompanying drawings.

BRIEF DESCRIPTION OF THE DRAWINGS

For fuller understanding of the nature and object of the present invention, reference should be made to the following detailed description taken in conjunction with the accompanying drawings in which.

DETAILED DESCRIPTION OF THE PREFERRED EMBODIMENTS

Figure 1A:
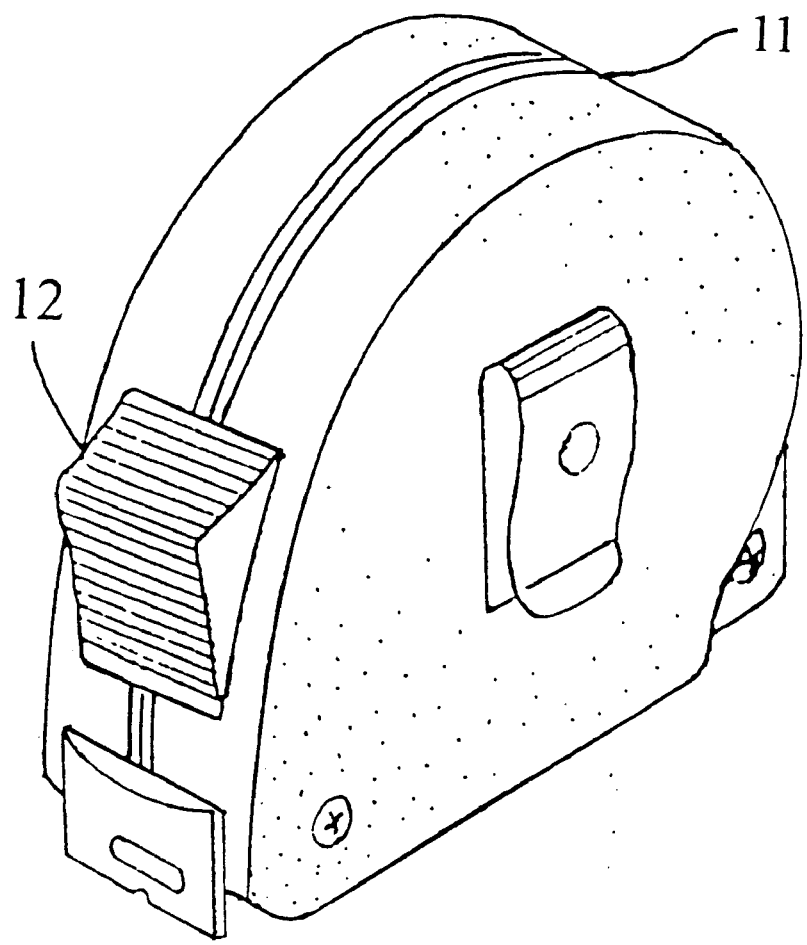
FIG. 1A is a schematic drawing of a conventional measuring tape dispenser.
Figure 1B:
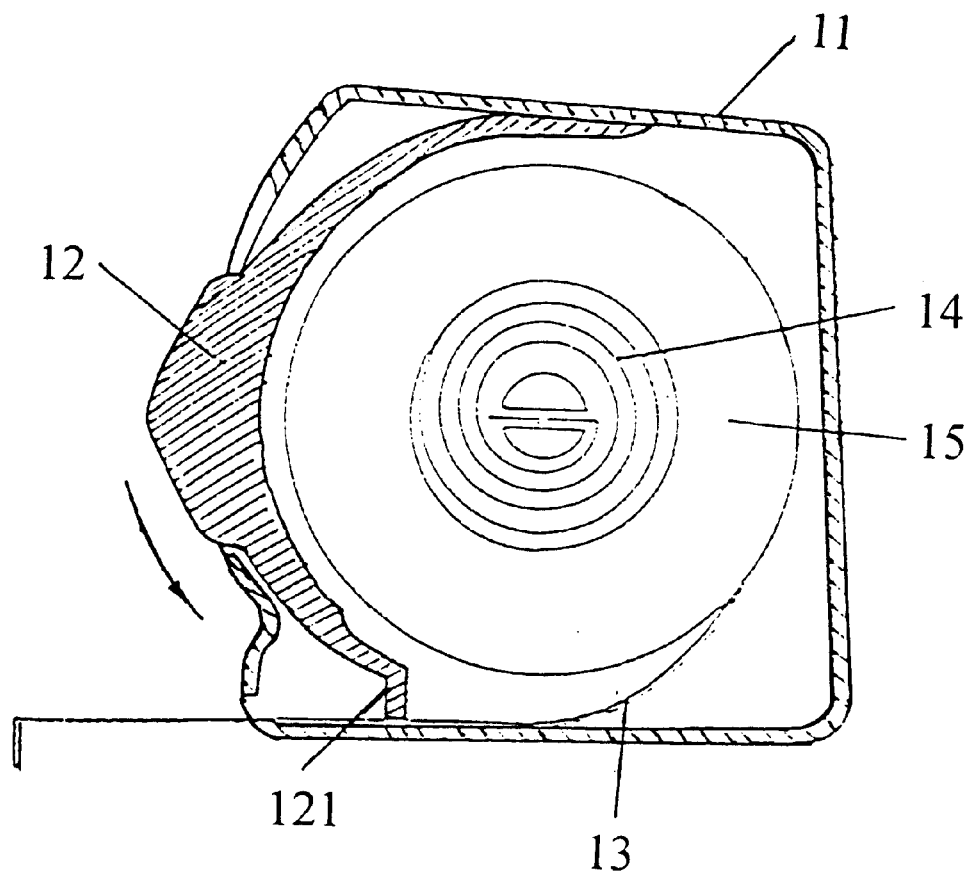
FIG. 1B is a cross sectional view of a conventional measuring tape dispenser.

FIGS. 1A and 1B are drawings showing the structure for a conventional measuring tape dispenser. The construction and related shortcomings have been illustrated above and thus will not be repeated again.

Figure 2:
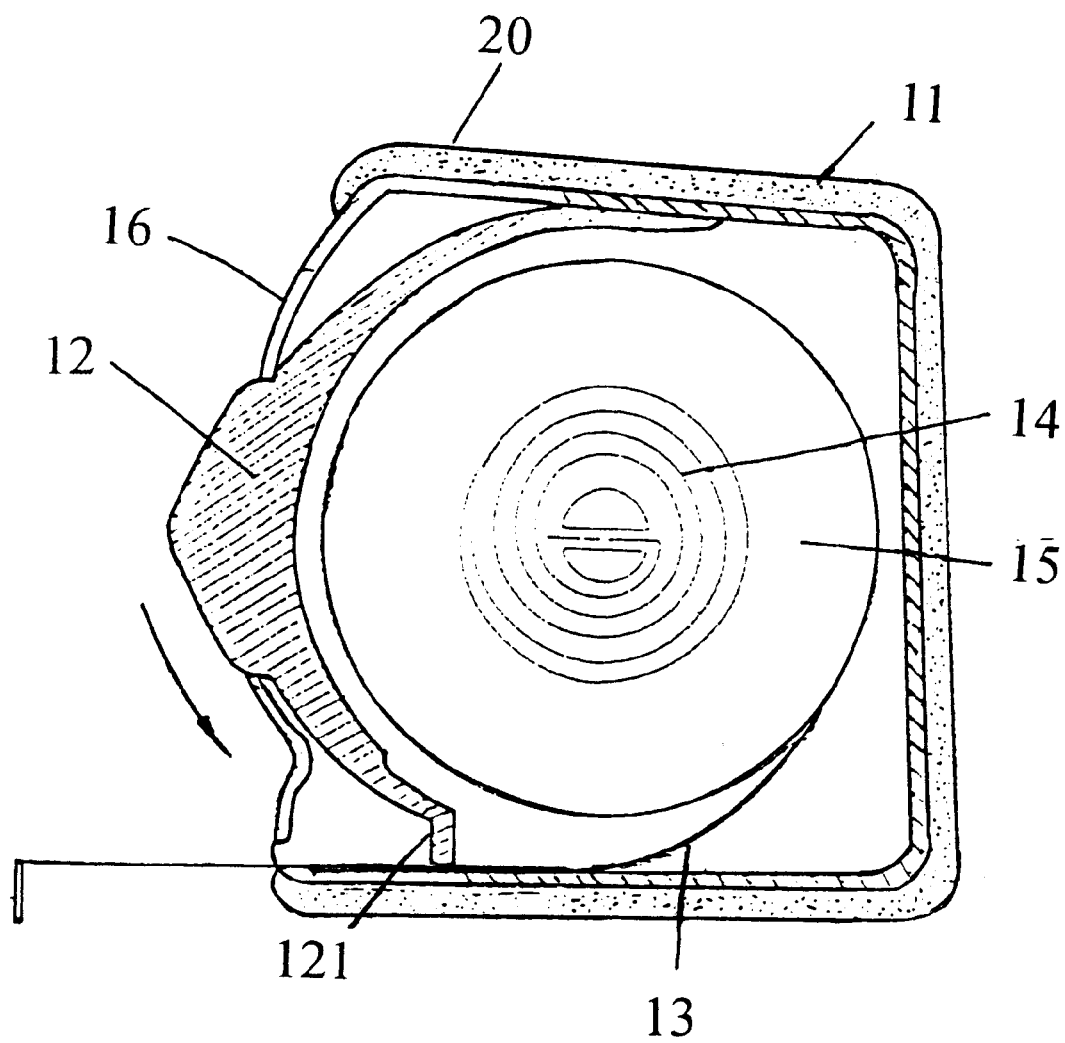
FIG. 2 is a cross sectional view of the housing of the measuring tape dispenser enclosed with an elastic material according to the present invention.

As shown in FIG. 2, the measuring tape dispenser of the present invention is also constituted of a housing 11, a brake push button 12, a tape 13, a coiled spring 14 and a reel 15. The housing is formed of a brittle material, for example, ABS which is vulnerable to impact. The housing 11 is entirely or partially, for example, only at the turning corners, covered with an impact buffer and slip resistant layer formed of an elastic material, such as rubber, as protective means 20 so as to protect the housing 11 from being deformed or even destroyed by impact or falling down to the ground from slipping off the operator's hand. The protective means 20 preferably has an appropriate thickness sufficient to cover the housing 11. If the protective means (layer) 20 is to be partially applied, it is preferable to cover the turning corners of the housing 11. Besides, the elastic protective layer 20 is also slip resistant which is useful for preventing the measuring tape dispenser from slipping off the control of the operator's hand as mentioned above. The brake push button 12 is located at the upper portion of a slide slot 16 formed on the housing 11. When the lower terminal 121 of the push button 12 is pressed against the tape 13, the tape 13 is detained thereat.

Figure 3:
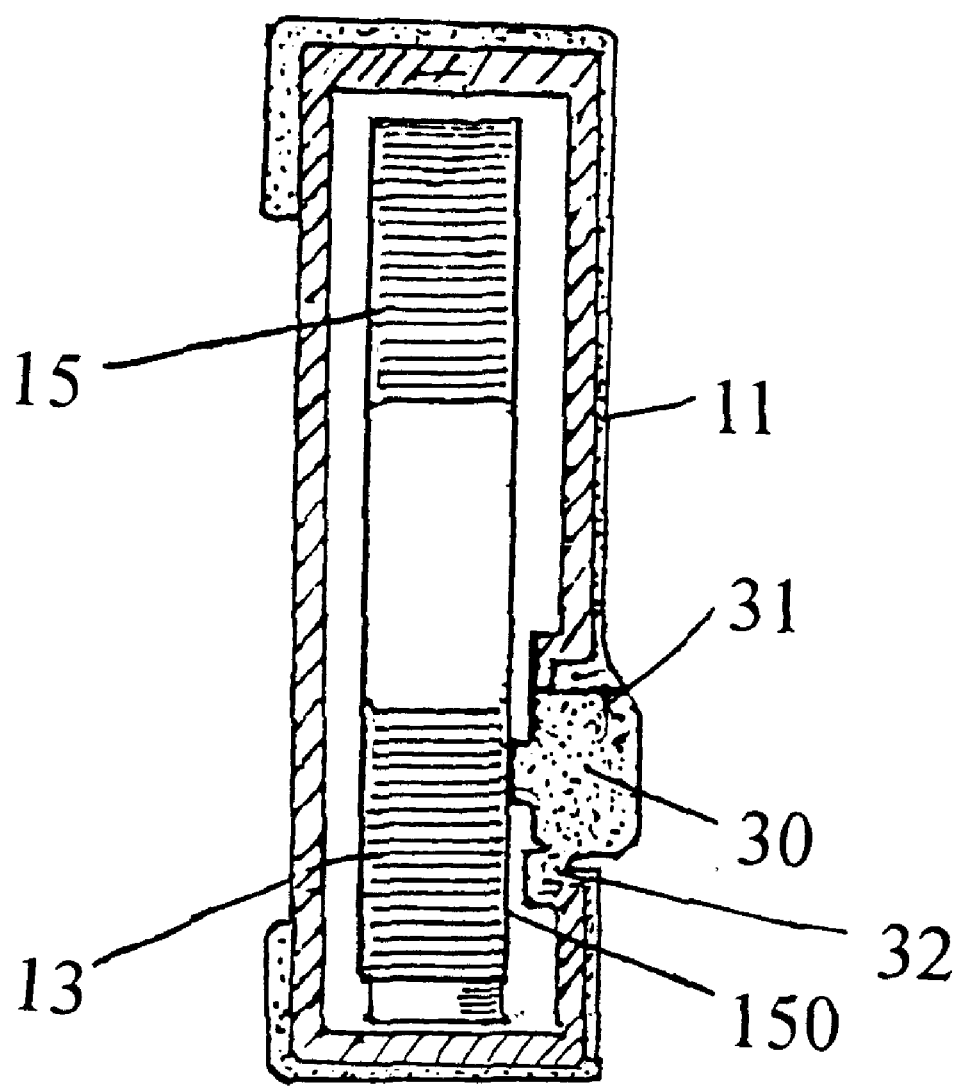
FIG. 3 is a cross sectional view of the measuring tape dispenser with tentative tape halting means according to the present invention.

FIG. 3 is a cross sectional view of the measuring tape dispenser with tentative tape halting means according to the present invention. As shown in the drawing, there is a tentative push button 30 provided on a lower portion of the housing 11 facing against the side wall of a reel 15 installed in the housing 11. The tentative push button 30 is integrally formed with the protective means 20 by the material similar to that of the former. Meanwhile, a protuberance 31 is formed at the inner side wall of the tentative push button 30 so as to lightly oppress the side wall 150 of the reel 15 when the push button 30 is pressed. As a result, the rotation of the reel 15 is stopped and the tape 13 is detained tentatively at a transient position where it is desired by the operator during reeling in or reeling out the tape 13. Herein, the tentative push button 30 is formed into a cylindrical figure with a protuberance 3 1, or it can be formed into other proper shapes. As the tentative push button 30 is made of the same elastic material as that of the protective means 20, and in addition to the protuberance 31 for stopping rotation of the reel 15, the portion of the housing 11 surrounding the push button 30 is formed into a slightly concaved boundary surface with respect to push button 30, therefore pressing of the push button 30 is facilitated with a comfortable feeling.

Figure 4:
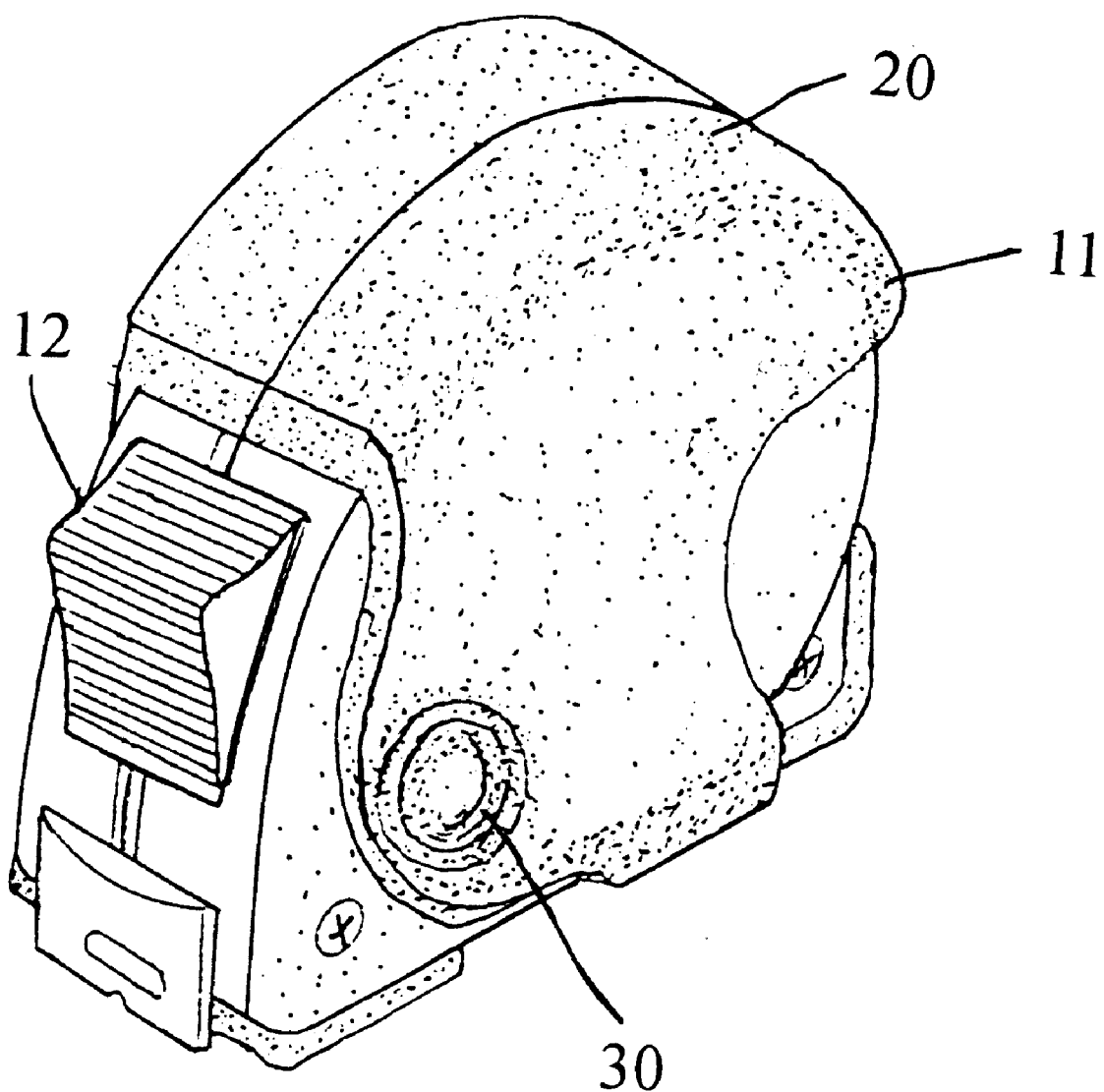
FIG. 4 is a schematic drawing of a measuring tape dispenser with an impact buffer housing and tentative tape halting means according to the resent invention.

Referring to FIG. 4, this is a drawing showing a schematic view of a measuring tape dispenser with an impact buffer housing and tentative tape halting means according to the present invention. As shown in FIG. 4, two elaborately designed component parts in addition to components of a conventional tape rule by the present invention, i.e. an elastic protection means (layer) 20 for protection of the housing 11, and a tentative push button 30 for tentatively halting the tape 13 and their state of installation are clearly shown.

How the objects mentioned above are achieved by these two essential components will no doubt be understood through description of the foregoing embodiment of the present invention.

A variety of modifications and variations of the present invention are possible in light of the above teachings. It is therefore to be understood that within the scope of the appended claims, the present invention may be practiced otherwise than as specially described hereinabove.

What is claimed is:

1. A measuring tape dispenser having a measuring tape wound on a reel, the measuring tape having an end portion, the measuring tape dispenser comprising:

a) a housing enclosing the reel and measuring tape, the end portion of the measuring tape extending exteriorly of the housing, the housing having a top portion, a bottom portion, and two opposite sides extending between the top and bottom portions, at least one of the sides having an opening therethrough;

b) a protective layer of elastic material covering the top portion and at least a portion of one side from the top portion to the bottom portion so as to cover the opening in the side; and, c) a push button formed integrally with the protective layer and located so as to extend through the opening in the side, the push button having a protuberance extending therefrom such that when the push button is pressed, the protuberance contacts a side of the reel to prevent winding of the measuring tape thereon, a cross-sectional dimension of the protuberance being smaller than a cross-sectional dimension of the push button.

* * * * *